US011660919B2

(12) United States Patent
Tarasinski et al.

(10) Patent No.: US 11,660,919 B2
(45) Date of Patent: May 30, 2023

(54) CURRENT SUPPLY SYSTEM FOR A TEAM OF VEHICLES

(71) Applicant: DEERE & COMPANY, Moline, IL (US)

(72) Inventors: Nicolai Tarasinski, Frankenthal (DE);
Volker Kegel, Kaiserslautern (DE);
Simon Pfaffmann, Mannheim (DE);
Julian Daubermann, Stuttgart (DE);
Felipe De Moraes Boos, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 722 days.

(21) Appl. No.: 16/810,487

(22) Filed: Mar. 5, 2020

(65) Prior Publication Data

US 2020/0298641 A1    Sep. 24, 2020

(30) Foreign Application Priority Data

Mar. 18, 2019  (DE) .......................... 102019203653.8

(51) Int. Cl.
*B60D 1/62*     (2006.01)
*A01B 76/00*    (2006.01)
(Continued)

(52) U.S. Cl.
CPC ................ *B60D 1/62* (2013.01); *A01B 76/00* (2013.01); *B60D 1/185* (2013.01); *B60D 1/187* (2013.01); *B60L 9/00* (2013.01); *H02G 11/003* (2013.01)

(58) Field of Classification Search
CPC .......... B60D 1/62; B60D 1/185; B60D 1/187; A01B 76/00; B60L 9/00; H02G 11/003
See application file for complete search history.

(56) References Cited

U.S. PATENT DOCUMENTS

2014/0027228 A1   1/2014  Tojima et al.
2016/0088787 A1*  3/2016  Connell ................. A01B 76/00
                                                701/33.9
(Continued)

FOREIGN PATENT DOCUMENTS

DE    102017217481 A1    4/2019
DE    102018108024 A1   10/2019
(Continued)

OTHER PUBLICATIONS

European Search Report issued in counterpart application No. 20162799.9 dated Aug. 3, 2020 (07 pages).

*Primary Examiner* — Jared Fureman
*Assistant Examiner* — Duc M Pham

(57) ABSTRACT

A current supply system of a team vehicle includes a towing vehicle operable in a cable-interconnected manner and an agricultural rear-mounted device coupled to the towing vehicle. The agricultural rear-mounted device has working equipment for performing a ground processing function. A base mast is allocated to the towing vehicle for producing a cable connection to a current supply interface of a first team vehicle that is travelling ahead, and an additional mast includes a further current supply interface allocated to the agricultural rear-mounted device for producing a further cable connection to a second team vehicle that is following. The additional mast is downstream of the working equipment of the agricultural rear-mounted device when viewed in a forward direction of travel of the team vehicle.

20 Claims, 3 Drawing Sheets

(51) Int. Cl.
*B60D 1/18* (2006.01)
*H02G 11/00* (2006.01)
*B60L 9/00* (2019.01)

(56) References Cited

U.S. PATENT DOCUMENTS

| | | | | |
|---|---|---|---|---|
| 2019/0103739 A1* | 4/2019 | Kegel | ............... | H02G 11/003 |
| 2020/0005474 A1* | 1/2020 | Ferrari | ............... | G06T 7/0012 |
| 2020/0024102 A1* | 1/2020 | Brill | ............... | A01B 76/00 |

FOREIGN PATENT DOCUMENTS

| | | | |
|---|---|---|---|
| DE | 102018212150 A1 | 1/2020 | |
| GB | 801770 A | 9/1958 | |

* cited by examiner

CURRENT SUPPLY SYSTEM FOR A TEAM OF VEHICLES

RELATED APPLICATIONS

This application claims priority to German Patent Application Ser. No. 102019203653.8, filed Mar. 18, 2019, the disclosure of which is hereby incorporated by reference in its entirety.

FIELD OF THE DISCLOSURE

The present disclosure relates to a current supply system of a team vehicle including a towing vehicle that may be operated in a cable-interconnected manner and also an agricultural rear-mounted device that is attached to said towing vehicle, where the agricultural rear-mounted device has working equipment for performing a ground processing function

BACKGROUND

Conventional concepts for supplying vehicles with electrical energy provide the use of rechargeable vehicle batteries. Owing to the high power densities that are required in particular in agricultural machines or construction machines, alternative concepts are also pursued in which the electrical current is transferred in a cable-interconnected manner to the commercial vehicle that is to be supplied. Since the relevant commercial vehicles are frequently operated in teams of vehicles or rather form a formation of team vehicles so as to perform coordinated work, it is necessary in the case of a cable-interconnected energy supply of the commercial vehicles to provide an accordingly coordinated cable guiding arrangement. This applies in particular when turning maneuvers are performed.

Thus, there is a need for a current supply system of a team vehicle to the extent that the current supply system ensures a coordinated cable guiding arrangement within a formation of team vehicles even when a turning maneuver is performed.

SUMMARY

In the present disclosure, a current supply system of a team vehicle comprises a towing vehicle that may be operated in a cable-interconnected manner and an agricultural rear-mounted device that is attached to the towing vehicle, the agricultural rear-mounted device having working equipment for performing a ground processing function. A base mast is allocated to the towing vehicle so as to produce a cable connection to a current supply interface of a team vehicle that is travelling ahead, and an additional mast having a further current supply interface is allocated to the agricultural rear-mounted device so as to produce a further cable connection to a team vehicle that is following, wherein the additional mast is downstream of the working equipment of the agricultural rear-mounted device when viewed in the forwards direction of travel of the team vehicle. In this manner, it is possible for the cable connection to extend to an arbitrary number of further team vehicles with the result that it is possible to network the team vehicles to one another into one formation of team vehicles that is operated electrically.

During the processing procedure, the individual team vehicles move one behind the other in a formation of team vehicles over a field that is to be processed. If the foremost team vehicle or the leading vehicle reaches the headland in the edge region of the field, all the team vehicles that are following must thus likewise turn one after the other in order to turn into the next field section that is to be processed. Since each of the team vehicles that are following the leading vehicle is electrically connected to the downstream additional mast of the front vehicle, collisions with the cable connections that extend between the team vehicles are ruled out while performing the turning maneuver. In this manner, a coordinated cable guiding arrangement is always ensured.

In this case, the leading vehicle is fitted with means for producing a current supply connection to a stationary energy supply device that is by way of example in the form of a substation on the edge of the field region that is to be processed. The means for producing the current supply connection is, for example, a cable drum having an actively controlled cable guiding arm, as is disclosed in DE 10 2018 212 150 A1.

Typically, the team vehicles are embodied as tractors that may be operated electrically having agricultural mounted devices that are attached to the rear. The agricultural rear-mounted devices may be of an arbitrary type and may be used to perform diverse ground processing functions. It is thus possible for an agricultural rear-mounted device that engages with the ground to be in the form of a plough, a cultivator, a seed-sowing unit or the like, however this may also be embodied as a fertilizer spreader, sprayer boom, transport trailer, hay-loading trailer or liquid manure trailer.

The base mast or additional mast is in particular in the shape of a holding structure that extends in the direction of a vertical axis of the towing vehicle or of the agricultural rear-mounted device. The holding structure is embodied from steel, a high-strength aluminium alloy or fiber-reinforced synthetic material.

A rotatable winding drum is typically located in an upper end region of the base mast so as to mount a carrier wire, wherein the carrier wire is used to guide an energy transmission cable or data transmission cable that may be connected to the current supply interface of the team vehicle that is travelling ahead. The carrier wire in this case may attach in a detachable manner by a detachable coupling device in the upper end region of the additional mast to the team vehicle that is travelling ahead. In this manner, it may be ensured that the energy transmission cable or data transmission cable extends at a safe distance with respect to the ground.

The winding drum that is allocated to the base mast may comprise in particular a drum body for receiving the carrier wire, wherein the drum body may be set into rotation by actuating a motorized drive so as to reel in or reel out the carrier wire. The motorized drive is typically embodied as an electric transmission motor. A device that cooperates with the electric transmission motor so as to control torque renders it possible to maintain a predetermined wire tension with the result that it is possible to avoid excess slack of the carrier wire between the masts of the team vehicles. In relation to the further details, reference is made to the current supply system that is described in DE 10 2017 217 481 A1. The carrier wire is generally embodied from a plurality of metal wires or high-strength synthetic fibers.

Furthermore, it is conceivable that the agricultural rear-mounted device comprises an auxiliary axle that may be adjusted between a lowered transporting position and a raised working position, the auxiliary axle having at least one supporting wheel, wherein the additional mast is coupled in terms of motion to an adjusting mechanism of the auxiliary axle in such a manner that the additional mast may be lowered or raised together with the auxiliary axle. This permits a large amount of cable slack in the working position, which reduces the tensile force in the carrier wire during the field work and therefore the load of the masts or the holding structures that the masts comprise. Conversely, in the transporting position, the lowering of the additional mast leads to a corresponding reduction of the entire height of the team vehicle in the region of the agricultural rear-mounted device, which is advantageous during transportation on a low loader or when travelling on roads with regard to possible height restrictions along the transportation route. The latter situation may arise by way of example owing to bridges, tunnels, power lines or the like.

The adjusting mechanism is embodied in the form of a parallelogram guidance arrangement in such a manner that the additional mast maintains its spatial orientation when the auxiliary axle is lowered or raised. In other words, a parallel displacement of the additional mast occurs with the result that when the auxiliary axle is raised into the working position, a defined cable tension is simultaneously built up in a carrier wire that is attached to the additional mast.

In addition, there is the possibility that a guiding arrangement is provided on the additional mast, the guiding arrangement holding a carrier wire, which may be attached to the additional mast, at a predetermined spacing with respect to constructive structures of the team vehicle. The guiding arrangement may be a dragging chain that is arranged in the upper end region of the additional mast and it is possible to attach the carrier wire to the free ends of the dragging chain by means of the detachable coupling device. The links or joints of the dragging chain are embodied in such a manner that only one pivoting movement is possible in a horizontal plane that extends perpendicular with respect to the additional mast, wherein the bending radius is not less than a specific minimum bending radius, the minimum bending radius being measured in such a manner that the carrier wire is deflected around the constructive structures of the team vehicle safely or without collision. In lieu of a dragging chain, the use of pulleys or the like is also conceivable for this purpose.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
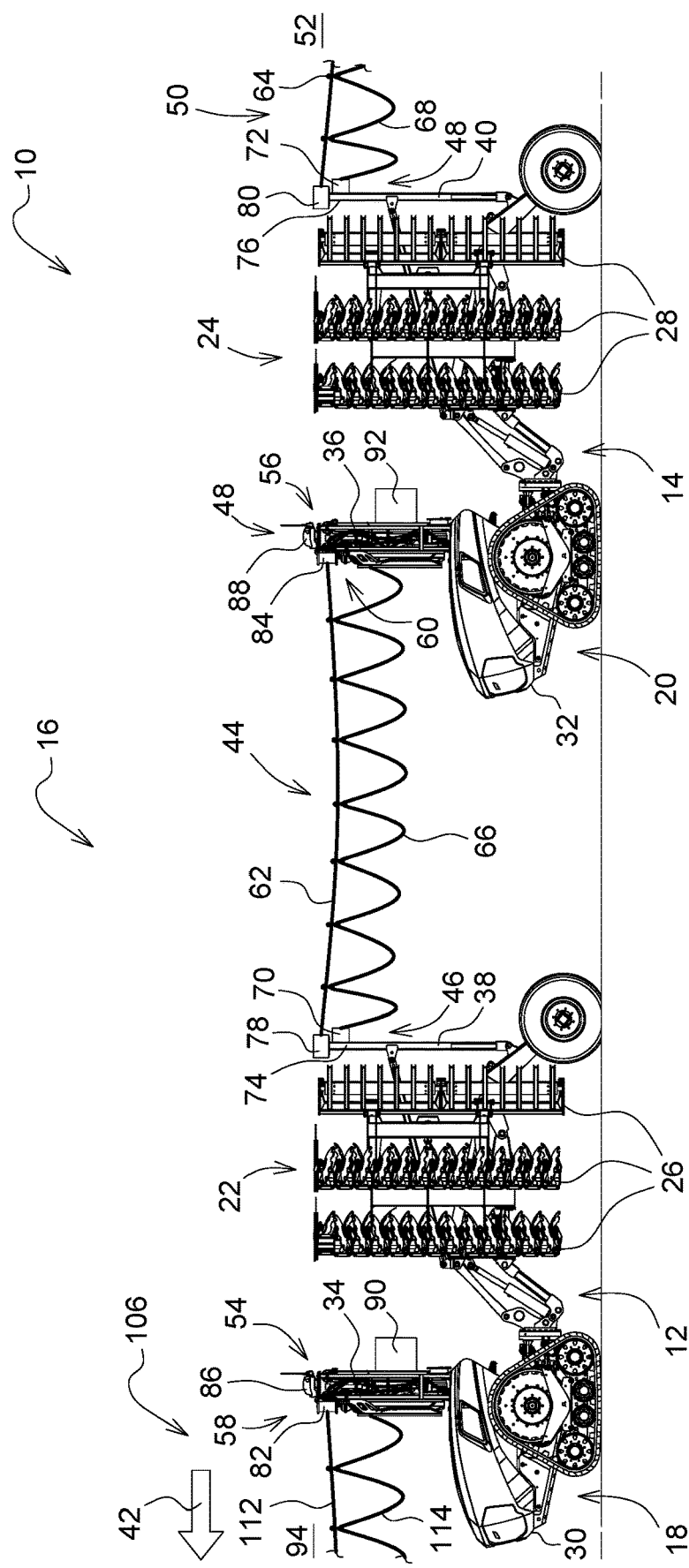
FIG. 1 illustrates a team of vehicles that is fitted with a current supply system in accordance with the disclosure.

FIG. 1 illustrates a team of vehicles that is fitted with one embodiment of a current supply system in accordance with the present disclosure.

For clarity, in FIG. 1 of the team of vehicles 10 only a first team vehicle 12 that is travelling ahead and a second team vehicle 14 that is following are illustrated; in fact the current supply system 16 may be extended to an arbitrary number of further team vehicles that are travelling ahead or following, wherein these team vehicles are networked to one another into a formation of team vehicles that may be operated electrically.

Each of the team vehicles 12, 14 comprises a towing vehicle 18, 20 that may be operated in a cable-interconnected manner and also an agricultural rear-mounted device 22, 24 that may be attached to the towing vehicle, the agricultural rear-mounted device having working equipment 26, 28 for performing an associated ground processing function. In the present case, the team vehicles 12, 14 are embodied as agricultural tractors 30, 32 that drive autonomously, and a cultivator having a seed-sowing unit that follows the cultivator is attached to the rear of the tractors.

Furthermore, a base mast 34, 36 is allocated to the towing vehicle 18, 20 and an additional mast 38, 40 is allocated to the agricultural rear-mounted device 22, 24. The additional mast 38, 40 is respectively downstream of the working equipment 26, 28 of the agricultural rear-mounted device 22, 24 when viewed in the forwards direction of travel 42 of the team vehicle 12, 14. A cable connection 44 to a current supply interface 46 that is arranged on the additional mast 38 of the first team vehicle 12 is produced via the base mast 36 of the second team vehicle 14.

As is likewise apparent in FIG. 1, a further current supply interface 48 is arranged on the additional mast 40 of the second team vehicle 14. This further current supply interface is used to produce a further cable connection 50 to a third team vehicle 52 that is not illustrated, the third team vehicle following the second team vehicle 14.

The base mast 34, 36 or the additional mast 38, 40 comprises the shape of a holding structure that extends in the direction of a vertical axis of the towing vehicle 18, 20 or of the agricultural rear-mounted device 22, 24. The holding structure is embodied by way of example from steel, a high-strength aluminum alloy or fiber-reinforced synthetic material.

A rotatable winding drum 58, 60 is located in an upper end region 54, 56 of the base mast 34, 36 so as to mount a carrier wire 62, 64, wherein the carrier wire 62, 64 is used to guide an energy transmission cable or data transmission cable 66, 68 that may be connected to the current supply interface 46, 48 of the team vehicle 12, 14. The current supply interface 46, 48 is an electrical plugging device 70, 72, whereas the carrier wire 62, 64 may attach in an upper end region 74, 76 of the additional mast 38, 40 by means of a detachable coupling device 78, 80.

The winding drum 58, 60 that is allocated to the base mast 34, 36 comprises a drum body 82, 84 for receiving the carrier wire 62, 64. The drum body 82, 84 may be set into rotation by means of actuating a motorized drive that is embodied as an electric transmission motor 86, 88 so as to reel in or reel out the carrier wire 62, 64. A device 90, 92 that cooperates with the electric transmission motor 86, 88 so as to control torque renders it possible to maintain a predetermined wire tension with the result that it is possible to avoid excess slack of the carrier wire 62, 64 between the masts 34, 36, 38, 40 of the team vehicles 12, 14. In relation to the further details, reference is made to the current supply system that is described in DE 10 2017 217 481 A1. The carrier wire 62, 64 is embodied from a plurality of metal wires or high-strength synthetic fibers.

Figure 2:
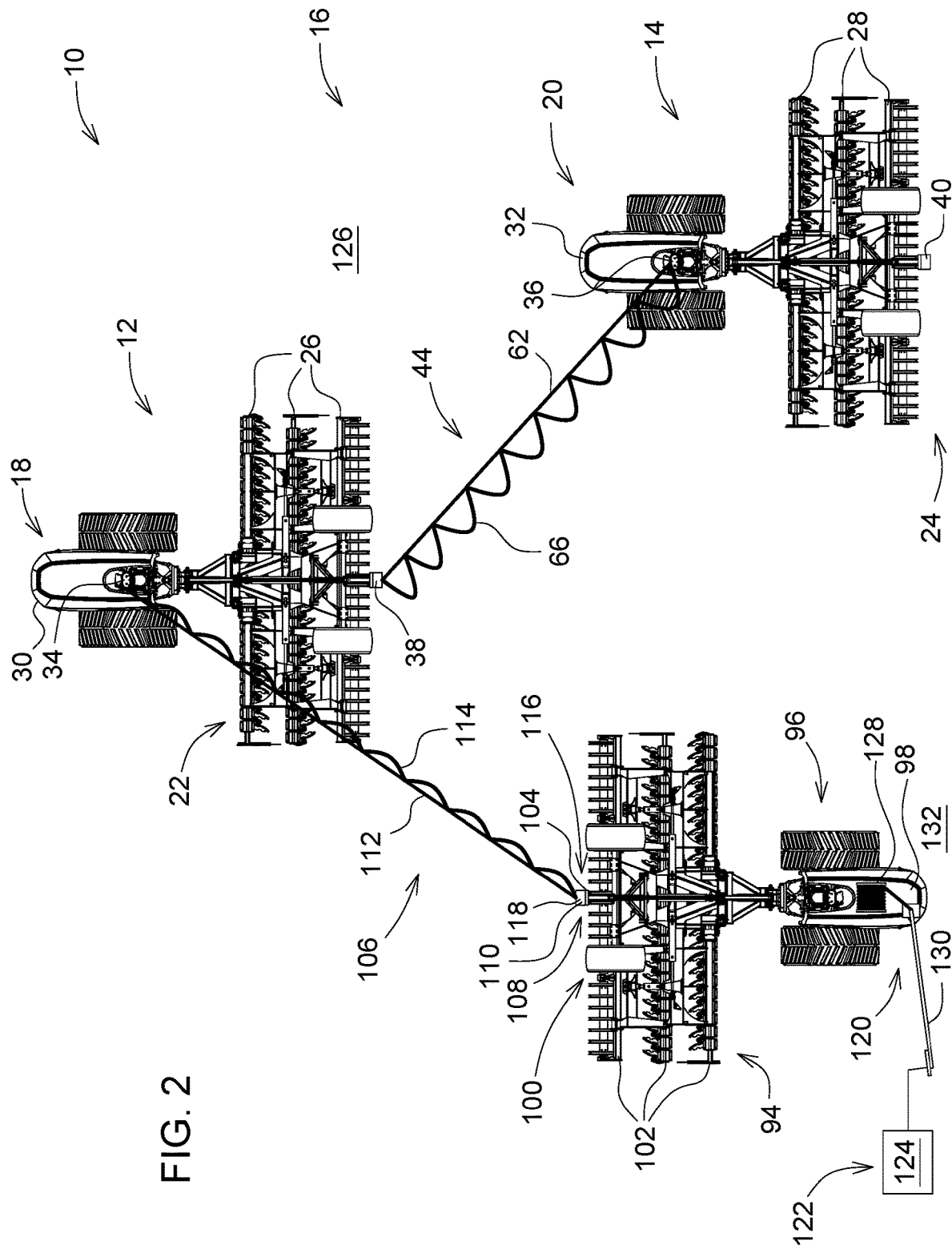
FIG. 2 illustrates a plan view of the team of vehicles when a turning maneuver is performed.

FIG. 2 illustrates a plan view of the team of vehicles 10 when a turning maneuver is performed, wherein in addition to the two team vehicles 12, 14 additionally a leading vehicle 94 that is leading the team of vehicles 10 is illustrated. The leading vehicle 94 comprises a construction that is comparable to the team vehicles 12, 14 that are following, the construction having a towing vehicle 96 that may be operated in a cable-interconnected manner in the form of an agricultural tractor 98 that drives autonomously and also an agricultural rear-mounted device 100, which is attached to the agricultural tractor, the agricultural rear-mounted device having working equipment 102 for performing an associated ground processing function. The latter is also illustrated here in an exemplary manner by means of a cultivator having a seed-sowing unit that follows the cultivator.

An additional mast 104 that corresponds to the team vehicles 12, 14 that follow the leading vehicle is attached to the agricultural rear-mounted device 100 of the leading vehicle 94 so as to produce a corresponding cable connection 106, and for this purpose the additional mast 104 likewise comprises a current supply interface 108 in the form of an electrical plugging device 110 to which an energy transmission cable or data transmission cable 114 is attached, the energy transmission cable or data transmission cable starting from the base mast 34 of the first team vehicle 12 and being guided by means of an associated carrier wire 112. The carrier wire 112 is attached in an upper end region 116 of the additional mast 104 by means of a detachable coupling device 118.

In lieu of a base mast, means for producing a current supply connection 120 to a stationary energy supply device 122 are provided on the leading vehicle 94, the energy supply device being in the form of a substation 124 on the edge of the field 126 that is to be processed. The means for producing the current supply connection 120 is a cable drum 128 having an actively controlled cable guiding arm 130, as is disclosed in DE 10 2018 212 150 A1.

During the processing procedure, the individual team vehicles 12, 14 move together with the leading vehicle 94 in the formation of team vehicles one behind the other over the field 126 that is to be processed. If the foremost team vehicle or leading vehicle 94 reaches the headland in the field edge region 132, all the team vehicles 12, 14 that are following must likewise turn one after the other in order to turn into the next field section that is to be processed. Since each of the team vehicles 12, 14 that are following the leading vehicle 94 is electrically connected to the downstream additional mast 38, 40, 104 of the vehicle in front, collisions with the cable connections 44, 50 that extend between the team vehicles 12, 14 including the leading vehicle 94 are ruled out while performing the turning maneuver. In this manner, a coordinated cable guiding arrangement is always ensured.

Figure 3:
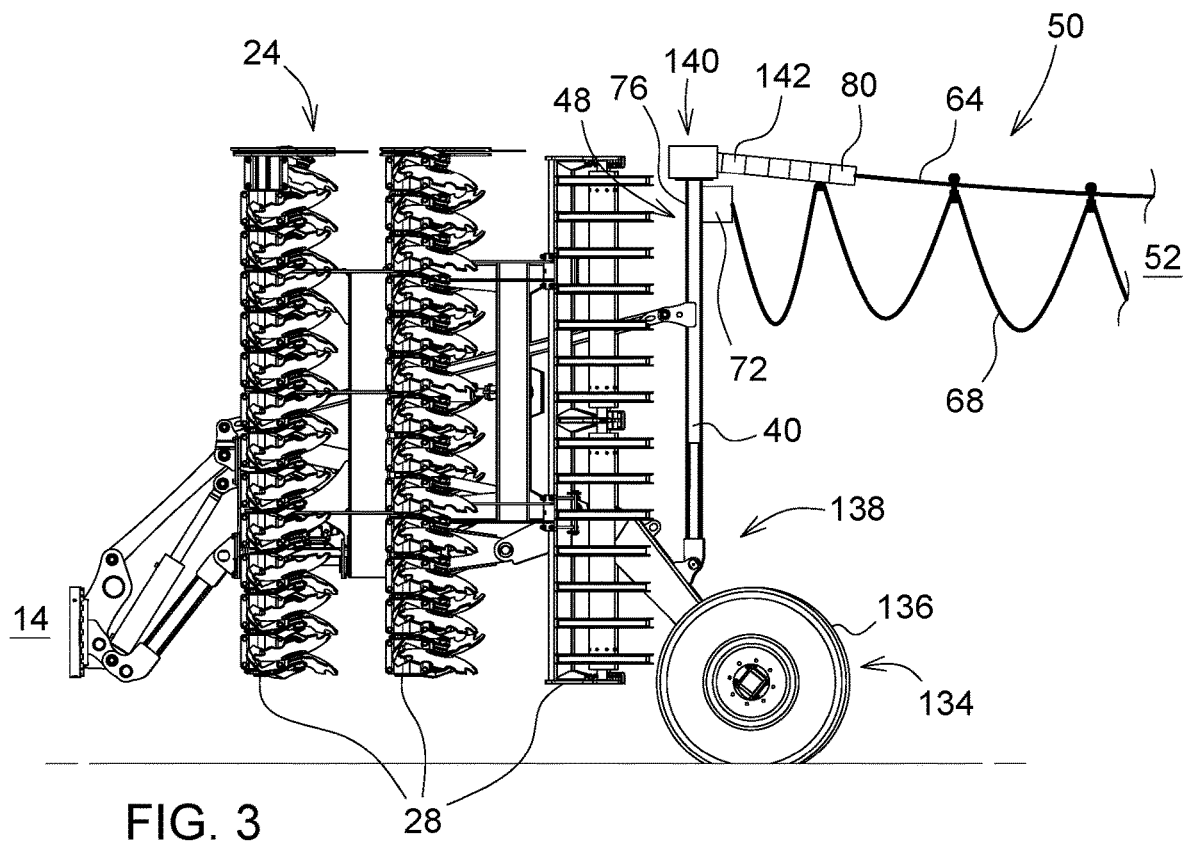
FIG. 3 illustrates a team vehicle comprising an agricultural rear-mounted device having an auxiliary axle that is raised in a working position.
Figure 4:
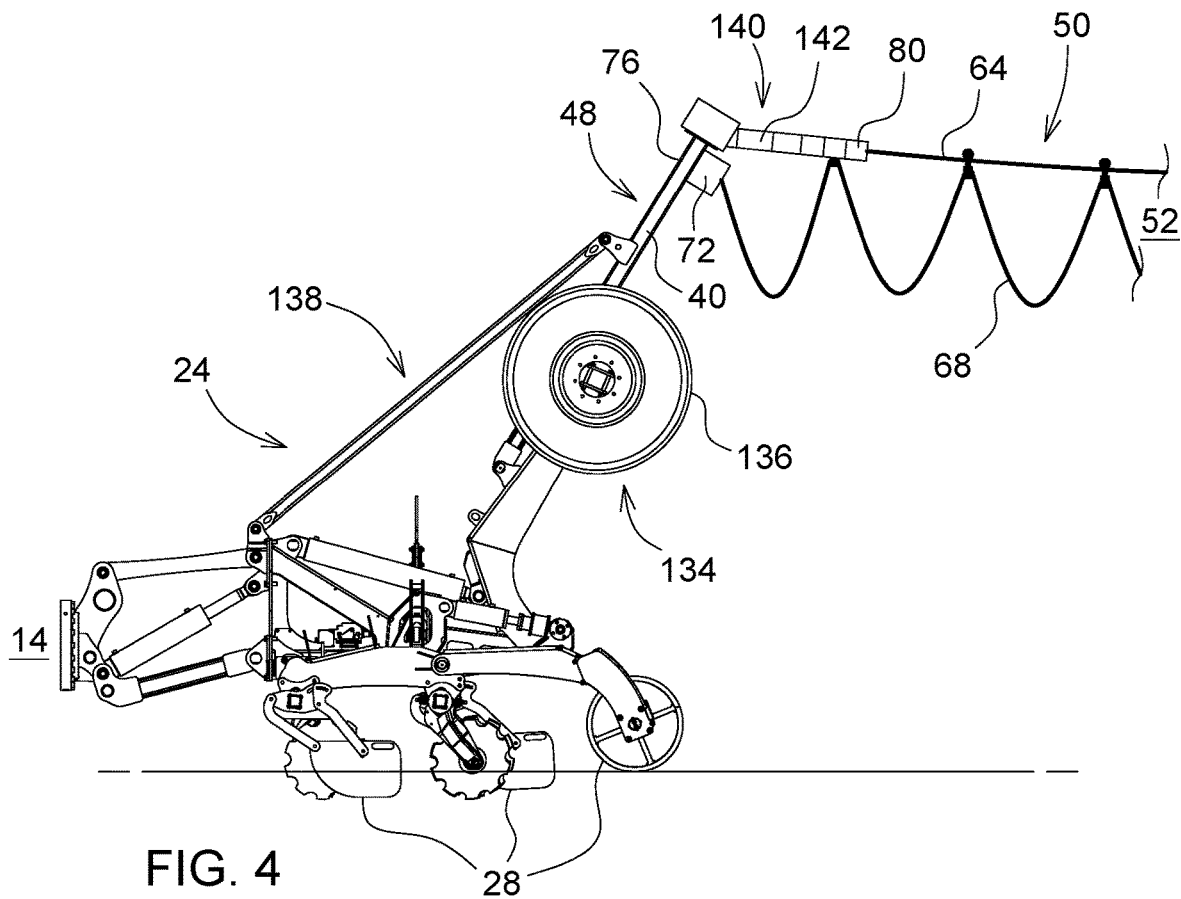
FIG. 4 illustrates the agricultural rear-mounted device, that is reproduced in FIG. 3, in which the auxiliary axle is brought into a lowered transporting position.

FIG. 3 or 4 illustrates the first team vehicle 14 that is representative of a single one of the individual team vehicles 12, 14. The associated agricultural rear-mounted device 22 comprises an auxiliary axle 134 that may be adjusted between a lowered transporting position (cf. FIG. 3) and a raised working position (cf FIG. 4), the auxiliary axle having at least one supporting wheel 136. The additional mast 38 is coupled in terms of motion to an adjusting mechanism 138 of the auxiliary axle 134 in such a manner that the additional mast may be lowered or raised together with the auxiliary axle 134. This permits a large amount of cable slack in the working position, which reduces the tensile force in the carrier wire 62 while processing the field and therefore the load of the masts or of the holding structures that the masts comprise. Conversely, in the transporting position, the lowering of the additional mast 38 leads to a corresponding reduction of the entire height of the team vehicle 12 in the region of the agricultural rear-mounted device 22, which is advantageous during transportation on a low loader or when travelling on roads with regard to possible height restrictions along the transportation route. The latter situation may arise by way of example owing to bridges, tunnels, power lines or the like.

The adjusting mechanism 138 is embodied in the form of a parallelogram guidance arrangement with the result that the additional mast 38 maintains its spatial orientation when the auxiliary axle 134 is lowered or raised.

Furthermore, a guiding arrangement 140 is provided on the additional mast 38, the guiding arrangement holding the carrier wire 62, which may be attached to the additional mast 38, at a predetermined spacing with respect to constructive structures of the team vehicle 12, in particular the agricultural rear-mounted device 22. The guiding arrangement 140 is a dragging chain 142 that is arranged in the upper end region 74 of the additional mast 38 and it is possible to attach the carrier wire 62 to the free ends of the dragging chain by the detachable coupling device 78. The links or joints of the dragging chain 142 are embodied in such a manner that only one pivoting movement is possible in a horizontal plane that extends perpendicular with respect to the additional mast 38, wherein the radius is not less than a specific minimum radius, the minimum radius being measured in such a manner that the carrier wire 62 is deflected around the constructive structures of the team vehicle 12 safely or without collision.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A current supply system of a team vehicle, comprising:
   a towing vehicle operable in a cable-interconnected manner;
   an agricultural rear-mounted device coupled to the towing vehicle, the agricultural rear-mounted device comprising working equipment for performing a ground processing function;
   a base mast allocated to the towing vehicle for producing a cable connection to a current supply interface of a first team vehicle that is travelling ahead; and
   an additional mast comprising a further current supply interface allocated to the agricultural rear-mounted device for producing a further cable connection to a second team vehicle that is following;
   wherein the additional mast is downstream of the working equipment of the agricultural rear-mounted device when viewed in a forward direction of travel of the team vehicle.

2. The current supply system according to claim 1, further comprising a rotatable winding drum located in an upper end region of the base mast so as to mount a carrier wire.

3. The current supply system according to claim 2, wherein the carrier wire is used to guide an energy transmission cable or data transmission cable connected to the current supply interface of the first team vehicle.

4. The current supply system according to claim 2, wherein the winding drum comprises a drum body for receiving the carrier wire.

5. The current supply system according to claim 4, wherein the drum body is rotatable by actuating a motorized drive so as to reel in or reel out the carrier wire.

6. The current supply system according to claim 1, wherein the agricultural rear-mounted device comprises an auxiliary axle adjustable between a lowered transporting position and a raised working position.

7. The current supply system according to claim 6, wherein the auxiliary axle comprises at least one supporting wheel.

8. The current supply system according to claim 7, wherein the additional mast is coupled to an adjusting mechanism of the auxiliary axle such that the additional mast is lowered or raised together with the auxiliary axle.

9. The current supply system according to claim 8, wherein the adjusting mechanism is embodied in the form of a parallelogram guidance arrangement such that the additional mast maintains its spatial orientation when the auxiliary axle is lowered or raised.

10. The current supply system according to claim 1, further comprising a guiding arrangement provided on the additional mast.

11. The current supply system according to claim 10, wherein the guiding arrangement holds a carrier wire attached to the additional mast at a predetermined spacing with respect to constructive structures of the second team vehicle.

12. A team of vehicles, comprising:
a plurality of team vehicles including at least a first team vehicle and a second team vehicle, where the first team vehicle is travelling ahead and the second team vehicle is following;
a current supply system for networking the plurality of team vehicles, the current supply system comprising:
a towing vehicle operable in a cable-interconnected manner;
an agricultural rear-mounted device coupled to the towing vehicle, the agricultural rear-mounted device comprising working equipment for performing a ground processing function;
a base mast allocated to the towing vehicle for producing a cable connection to a current supply interface of the first team vehicle; and
an additional mast comprising a further current supply interface allocated to the agricultural rear-mounted device for producing a further cable connection to the second team vehicle that is following;
wherein the additional mast is downstream of the working equipment of the agricultural rear-mounted device when viewed in a forward direction of travel of the team vehicle.

13. The team of vehicles according to claim 12, further comprising a rotatable winding drum located in an upper end region of the base mast so as to mount a carrier wire, wherein the carrier wire is used to guide an energy transmission cable or data transmission cable connected to the current supply interface of the first team vehicle.

14. The team of vehicles according to claim 13, wherein:
the winding drum comprises a drum body for receiving the carrier wire;
the drum body is rotatable by actuating a motorized drive so as to reel in or reel out the carrier wire.

15. The team of vehicles according to claim 12, wherein the agricultural rear-mounted device comprises an auxiliary axle adjustable between a lowered transporting position and a raised working position.

16. The team of vehicles according to claim 15, wherein the auxiliary axle comprises at least one supporting wheel.

17. The team of vehicles according to claim 15, wherein:
the additional mast is coupled to an adjusting mechanism of the auxiliary axle such that the additional mast is lowered or raised together with the auxiliary axle;
the adjusting mechanism is embodied in the form of a parallelogram guidance arrangement such that the additional mast maintains its spatial orientation when the auxiliary axle is lowered or raised.

18. The team of vehicles according to claim 12, further comprising a guiding arrangement provided on the additional mast, wherein the guiding arrangement holds a carrier wire attached to the additional mast at a predetermined spacing with respect to constructive structures of the second team vehicle.

19. A current supply system of a team vehicle, comprising:
a towing vehicle operable in a cable-interconnected manner;
an agricultural rear-mounted device coupled to the towing vehicle, the agricultural rear-mounted device comprising working equipment for performing a ground processing function;
a base mast allocated to the towing vehicle for producing a cable connection to a current supply interface of a first team vehicle that is travelling ahead;
an additional mast comprising a further current supply interface allocated to the agricultural rear-mounted device for producing a further cable connection to a second team vehicle that is following; and
a rotatable winding drum located in an upper end region of the base mast so as to mount a carrier wire, the winding drum including a drum body for receiving the carrier wire;
wherein the additional mast is downstream of the working equipment of the agricultural rear-mounted device when viewed in a forward direction of travel of the team vehicle;
wherein the carrier wire is used to guide an energy transmission cable or data transmission cable connected to the current supply interface of the first team vehicle.

20. The current supply system according to claim 19, further comprising an auxiliary axle of the agricultural rear-mounted device adjustable between a lowered transport position and a raised working position, the auxiliary axle including at least one supporting wheel;
wherein the additional mast is coupled to an adjusting mechanism of the auxiliary axle such that the additional mast is lowered or raised together with the auxiliary axle;
further wherein, the adjusting mechanism is formed as a parallelogram guidance arrangement such that the additional mast maintains its spatial orientation when the auxiliary axle is lowered or raised.

* * * * *